(12) United States Patent
Mill

(10) Patent No.: US 10,131,257 B2
(45) Date of Patent: Nov. 20, 2018

(54) PASSENGER SEAT

(71) Applicant: Franz Kiel GmbH, Noerdlingen (DE)

(72) Inventor: Juergen Mill, Ellwangen (DE)

(73) Assignee: Franz Kiel GmbH, Noerdlingen (DE)

( * ) Notice: Subject to any disclaimer, the term of this patent is extended or adjusted under 35 U.S.C. 154(b) by 0 days.

(21) Appl. No.: 14/683,432

(22) Filed: Apr. 10, 2015

(65) Prior Publication Data

US 2016/0297338 A1    Oct. 13, 2016

(51) Int. Cl.
  *B60N 2/68* (2006.01)
  *B60N 2/005* (2006.01)
  *B60N 2/06* (2006.01)

(52) U.S. Cl.
  CPC ............. *B60N 2/682* (2013.01); *B60N 2/005* (2013.01); *B60N 2/06* (2013.01); *B60N 2205/20* (2013.01)

(58) Field of Classification Search
  CPC .......... B60N 2/682; B60N 2/005; B60N 2/06; B60N 2205/20

USPC .......................................... 297/344.1, 344.24
See application file for complete search history.

(56) References Cited

U.S. PATENT DOCUMENTS

| | | | | |
|---|---|---|---|---|
| 1,446,588 A | * | 2/1923 | Schnupp | B60N 2/005 248/201 |
| 2,851,083 A | * | 9/1958 | Rhodes | B60N 2/12 297/341 |
| 9,050,690 B2 | * | 6/2015 | Hammer | B23K 37/04 |
| 2014/0138997 A1 | * | 5/2014 | Schulz | B60N 2/0244 297/344.24 |
| 2016/0185261 A1 | * | 6/2016 | Hammann | B60N 2/065 297/361.1 |

* cited by examiner

Primary Examiner — Milton Nelson, Jr.
(74) Attorney, Agent, or Firm — Mandelbaum Salsburg P.C.

(57) ABSTRACT

A passenger seat is provided. The passenger seat may have a structural part for accommodating a seat cushion, and having at least two connection elements serving for the connection with the vehicle structure and being arranged at a distance from each other, at least one of the connection elements is connected to the structural part by a fixed bearing. At least one of the connection elements is connected to the structural part by a floating bearing.

5 Claims, 4 Drawing Sheets

PASSENGER SEAT

The invention relates to a passenger seat having a structural part for accommodating a seat cushion, and at least two connection elements serving for the connection with the vehicle structure and being arranged at a distance from each other.

A variety of different passenger seats are known from the general prior art. Some of these are partly connected to the vehicle structure in order to enable them to move in the longitudinal direction of the vehicle. In this way, more free space can be provided within the vehicle to accommodate, for example, a wheelchair user. However, the problem with such passenger seats being movable along respective guide rails is that the seats have to be moved very accurately and with appropriate care to avoid jamming the guidance element in the guide rails.

The problem addressed by the invention is to create a passenger seat having a structural part and at least two connection elements serving for the connection with the vehicle structure, and which can be moved against the vehicle structure in a simple manner.

According to the present invention, this problem is solved by a passenger seat having a structural part for accommodating a seat cushion, and having at least two connection elements serving for the connection with the vehicle structure and being arranged at a distance from each other, wherein at least one of the connection elements is connected to the structural part by means of a fixed bearing, and wherein at least one of the connection elements is connected to the structural part by means of a floating bearing.

The fixed bearing of one of the connection elements together with the floating bearing of the other connection element provides for a tolerance compensation of the involved interconnected components. Thus, at any time and in any condition of the passenger seat a certain compensation between the structural part and the vehicle structure is made possible, so as to facilitate an easy movement of the passenger seat along its guide rails, not only when said guide rails run relatively straight, but also to facilitate a compensation between the guide rails and the passenger seat when the guide rails run insufficiently straight, so that the passenger seat can be easily moved even in such cases.

An easy way of constructing the floating bearing will result from an advantageous embodiment of the invention, wherein said floating bearing provides at least two movable threaded elements spaced apart from each other.

Furthermore, it can be provided that the at least two movable threaded elements are connected to the connection element and that each has a male thread, wherein said male thread engages into a component having a female thread and is connected to the structural part. This way, a secure connection between the respective connection elements and the structural part can be established.

If the component having a female thread and being connected to the structural part is a nut, which is welded onto the structural part, this results in a design of the component which serves for threading the threaded element onto the structural part and which can be easily constructed.

In order to establish rotatability of the movable threaded element, it can furthermore be arranged that at least two movable threaded elements are supported on at least one rotational axis running vertically with respect to the movable threaded element.

In this context, a simple pivot bearing of the movable threaded element can be established, when at least one rotational axis runs through the at least two movable threaded elements and through at least one rib attached to the connection element.

Furthermore, it can be provided that the at least two movable threaded elements each have a fork through which the at least one rotational axis runs, and which at least one rib clasps. This allows for a simple support of the threaded element at the rotational axis in connection with a support of the threaded element at the connection element.

To be able to absorb strong forces affecting the passenger seat, and thus to comply with certain structural requirements, it can furthermore be provided that the floating bearing has three rotatable threaded elements.

Furthermore, in an advantageous embodiment of the invention, the fixed bearing can have at least two inflexible threaded elements. This way, it might be possible to absorb strong forces affecting the passenger seat.

The above described solution for connecting the passenger seat to a vehicle structure is particularly beneficial if the connection elements are movably connected to the respective guide rails attached to the vehicle structure.

Below, an embodiment of the invention according to the drawing is illustrated in principle.

Figure 1:
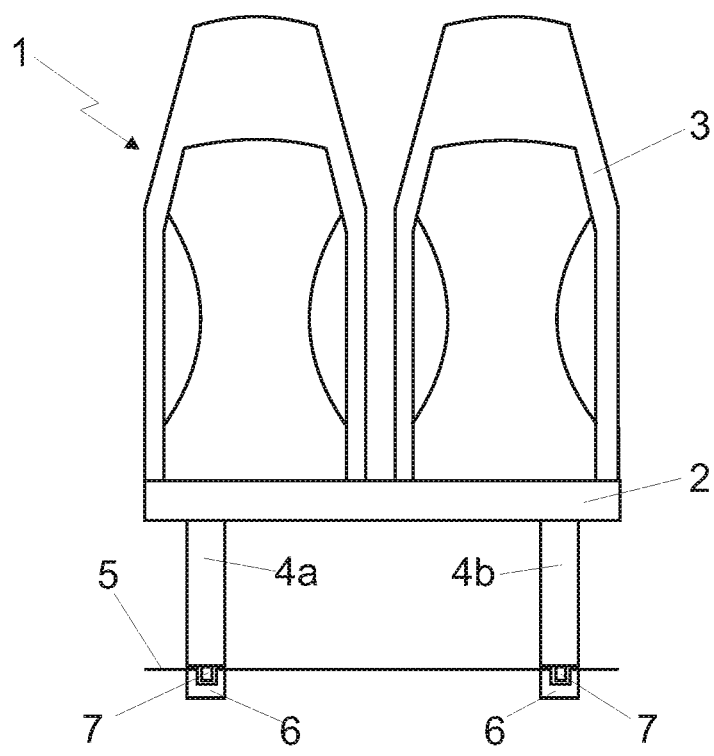
FIG. 1 shows a very schematic representation of a passenger seat according to the invention.

FIG. 1 depicts a passenger seat 1 for a vehicle not shown in its entirety, e.g. a bus. The passenger seat 1 has a seat cushion 2 and, in the present case, two back rests 3. In addition, the passenger seat 1 has two connection elements 4a and 4b, which are arranged at a distance from each other and serve to provide a connection between the passenger seat 1 and the vehicle structure 5. The vehicle structure 5 is preferably the floor of the vehicle.

The vehicle structure 5 includes two guide rails 6 running essentially in parallel and being arranged at a distance from each other that preferably equals the distance between the two connection elements 4a and 4b; said guide rails 6 engage in the engagement or locking elements 7 (not depicted in detail) of the connection elements 4a, 4b. The locking elements 7 are designed in a way that allows for a fixed lock of the connection elements 4a, 4b, and hence of the passenger seat 1, with the guide rails 6 in one position of said locking elements 7, and that enables a movement of the connection elements 4a, 4b, and hence of the passenger seat 1, along the guide rails 6 in another position. This way, the passenger seat 1 can be moved along the guide rails 6, for instance to provide for a certain free space within the vehicle to accommodate, for example, a wheelchair. The direction of motion of the vehicle in which the passenger seat 1 is mounted is marked by "x" in FIG. 2. The passenger seat 1 can likewise be moved in as well as against the direction "x".

Figure 2:
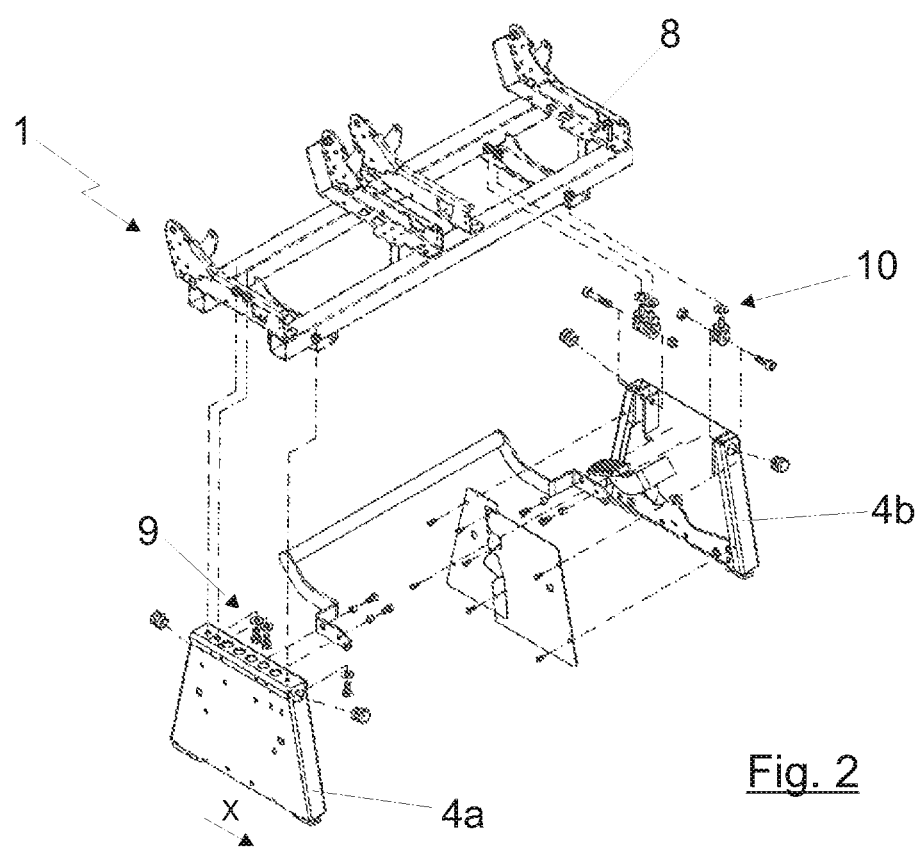
FIG. 2 shows an exploded view of a part of the passenger seat according to the invention.
Figure 3:
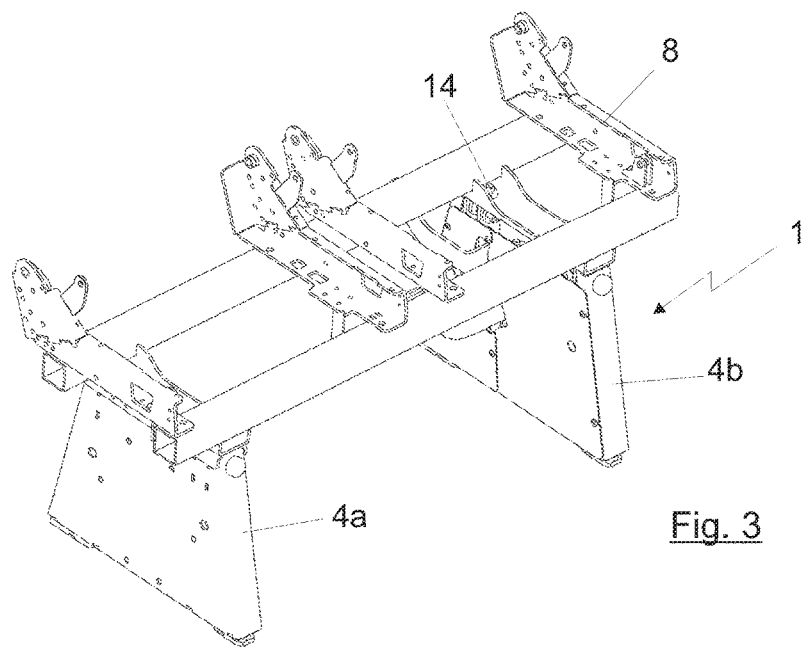
FIG. 3 shows the passenger seat from FIG. 2 in a mounted condition.

FIG. 2 shows in an exploded view a part of the passenger seat 1 from FIG. 1. Here a structural part 8 is depicted that serves to accommodate the seat cushion 2 not depicted in FIG. 2. As can be derived from FIG. 3, the two connection elements 4a and 4b are connected to the structural part 8 individually and independently from each other. In this case, the left connection element 4a depicted in FIGS. 2 and 3 is connected to the structural part 8 by means of a fixed bearing 9, whereas the right connection element 4b depicted in FIGS. 2 and 3 is connected to the structural part 8 by means of a floating bearing 10. It goes without saying that the arrangement of the connection elements 4a and 4b on the left or right side of the structural part 8 is purely discretionary.

The individual components of the fixed bearing 9 and the floating bearing 10 can be better recognized in FIGS. 4, 5, and 6 and will therefore be described in detail below, with reference to said figures.

Figure 4:
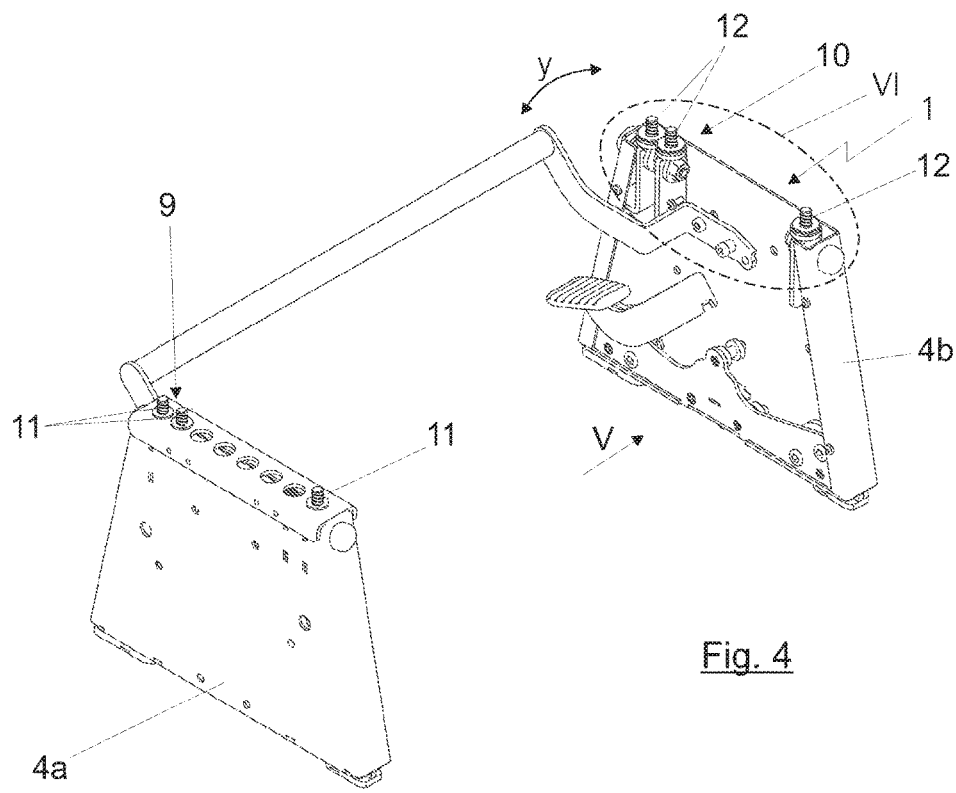
FIG. 4 shows a view according to FIG. 3, in which a structural part of the passenger seat has been omitted.

The fixed bearing 9 in the present case has three inflexible threaded elements 11, which can be recognized, for example, in FIG. 4. Here, two of the inflexible threaded elements 11 are arranged immediately next to each other, and the third threaded element 11 is arranged at a distance from the two threaded elements 11. This way, the fact that stronger forces apply to the rear part of the passenger seat 1 than to the front part of same is taken into account. As the case may be, it could be sufficient to provide only two inflexible threaded elements 11. In order to connect the connection element 4a to the structural part 8, the inflexible threaded elements 11 have a male thread (not depicted) facing the structural part 8 and engaging in a component (not depicted) which is connected to the structural part 8.

The floating bearing 10 in the illustrated embodiment has three movable threaded elements 12. Also in this case, two movable threaded elements 12 arranged immediately next to each other are provided in the rear area of the passenger seat 1 in order to absorb the stronger forces that occur in said area, and it might again be sufficient to provide only two movable threaded elements 12 spaced apart from each other.

Figure 5:
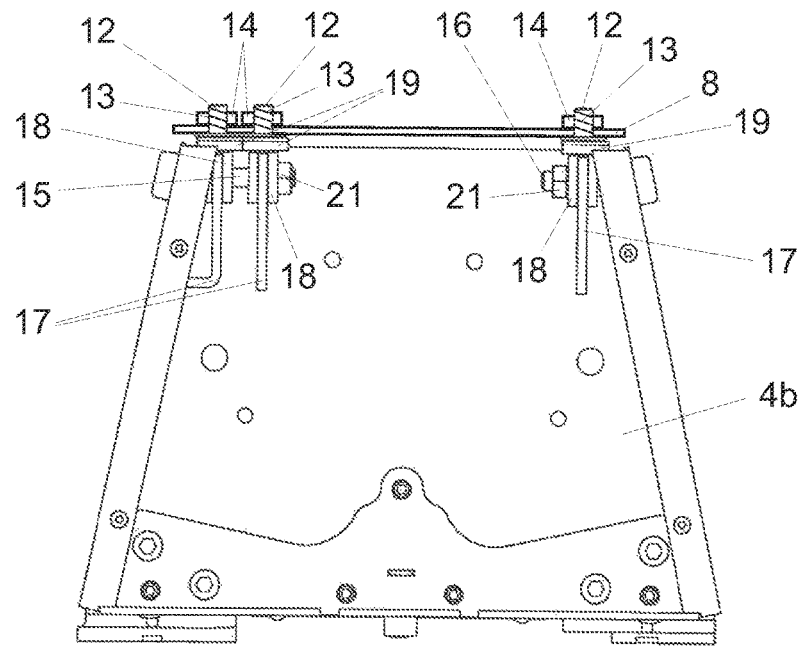
FIG. 5 shows a view according to arrow V from FIG. 4, in which parts have been omitted.

The movable threaded elements 12 are connected to the connection element 4b and each have a male thread 13 indicated in FIG. 5, by means of which they engage in a component 14 also indicated in FIG. 5, and connected with the structural part 8. The component 14, which in the illustrated embodiment is a nut welded onto the structural part 8, can also be distinguished in FIG. 3. Since a total number of six inflexible or movable threaded elements 11 or 12, respectively, is provided, a total number of six components 14 is also provided, wherein the male threads 13 of the inflexible or movable threaded elements 11 or 12, respectively, engage in same. Five of said components 14, which preferably are all realized as nuts welded onto the structural part 8, cannot be distinguished in FIG. 3 however, because they are hidden behind the structural part 8.

Figure 6:
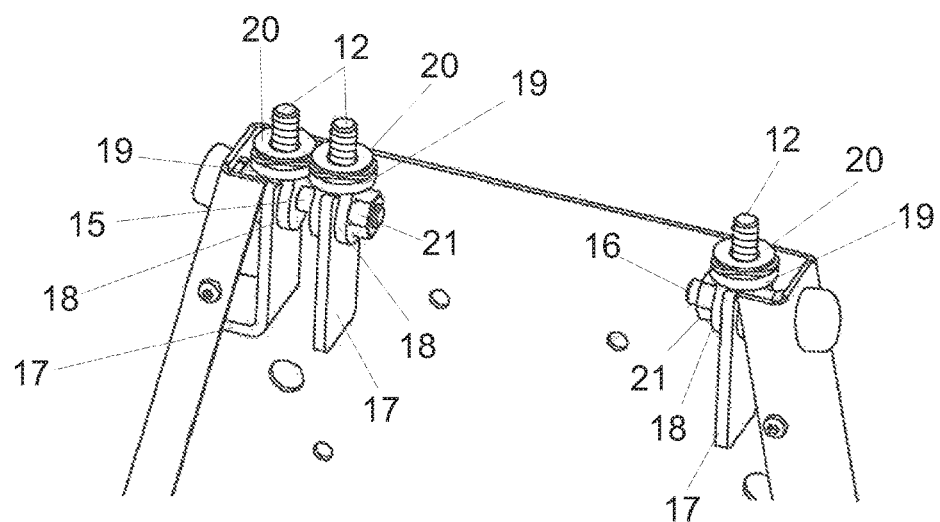
FIG. 6 shows an enlarged representation according to line VI from FIG. 4.

In FIGS. 5 and 6, the connection of the movable threaded elements 12 to the connection element 4b can be distinguished more clearly. It is clear from the latter that two of the movable threaded elements 12 are rotatably supported on a first rotational axis 15, and that the additional threaded element 12, which is spaced apart from the two movable threaded elements 12, is rotatably supported on a second rotational axis 16. The two rotational axes 15 and 16 thereby run through both the movable threaded elements 12 and the respective ribs 17, which are attached, for example by means of welding, to the connection element 4b. The movable threaded elements 12 each have forks 18, through which the respective rotational axis 15 or 16 runs, and which clasp the ribs 17. The forks 18 are thereby connected via a cylindrical section 19 to the section of the movable threaded element 12 having the male thread 13, and, in the present case, a washer 20, preferably realized as a disk spring, rests on said cylindrical section 19. The rotational axes 15 and 16 in the present case are formed by the particular screws which are screwed into the respective nuts 21. A the case may be, one continuous, i.e. running through all three movable threaded elements 12, rotational axis can be provided instead of the two independent rotational axes 15 and 16.

The assembly of the movable threaded elements 12 preferably is carried out such that the threaded elements 12 are first screwed into the respective component 14 on the structural part 8, and then are attached by means of the rotational axes 15 and 16 to the connection element 4b. In a similar way, the inflexible threaded elements 11 can be attached to the connection element 4a, whereby of course no rotational axes are present, since the inflexible threaded elements 11 are rigidly connected to the connection element 4a. By using disk springs as washers 20 it can be guaranteed that the threaded element 12 can be aligned such that the forks 18 can clasp around the ribs 17, or that the ribs 17 can engage in the respective slots of the forks 18, respectively.

For reasons of tolerance, a certain distance can exist between the ribs 17 and the respective forks 18 clasping around them. In order to avoid any unwanted movement as a result of said distance, particular distance washers can be located between the ribs 17 and the forks 18, and said distance washers can consist, for example, of a material having appropriate gliding properties, such as polytetrafluoroethylene. This way, it can also be avoided that the nuts 21 are screwed to the rotational axes 15 and 16 using too much force.

The floating bearing 10, which is connected to the structural part 8 by means of the connection element 4b, allows for a certain relative movement between the structural part 8 and the connection element 4b. This way, while moving along the guide rails 6, the entire passenger seat 1 can be swiveled to a certain extent according to the direction marked by a double arrow "y" in FIG. 4.

As opposed to the movable connection elements 12, the inflexible connection elements 11 are rigidly connected to the connection element 4a, and together they form the fixed bearing 9. However, this is not illustrated in the figures, since this can actually be achieved in an obvious way.

The invention claimed is:

1. A passenger seat having a structural part for accommodating a seat cushion, and having at least two connection elements serving for the connection with a vehicle structure and being arranged at a distance from each other, wherein at least one of the connection elements is connected to the structural part with a fixed bearing, and wherein at least one of the connection elements is connected to the structural part with a floating bearing; and wherein the floating bearing has at least two movable threaded elements spaced apart from each other.

2. The passenger seat according to claim 1, wherein the fixed bearing has at least two inflexible threaded elements.

3. The passenger seat according to claim 1, wherein the at least two movable threaded elements are connected to the connection element and each have a male thread, wherein said male thread engages into a component having a female thread and is connected to the structural part.

4. The passenger seat according to claim 3, wherein the component connected to the structural part and having a female thread is a nut welded onto the structural part.

5. The passenger seat according to claim 1, wherein the floating bearing has three rotatable threaded elements.

* * * * *